United States Patent
Park et al.

(10) Patent No.: US 10,000,204 B2
(45) Date of Patent: Jun. 19, 2018

(54) APPARATUS AND METHOD FOR LEARNING TOUCH POINT OF ENGINE CLUTCH OF HYBRID ELECTRIC VEHICLE

(71) Applicant: HYUNDAI MOTOR COMPANY, Seoul (KR)

(72) Inventors: Song Il Park, Seoul (KR); Do Hee Kim, Seongnam-si (KR); Yeon Bok Kim, Seongnam-si (KR); Sungdeok Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 20 days.

(21) Appl. No.: 15/221,874

(22) Filed: Jul. 28, 2016

(65) Prior Publication Data

US 2017/0120897 A1    May 4, 2017

(30) Foreign Application Priority Data

Oct. 30, 2015    (KR) .......................... 10-2015-0152445

(51) Int. Cl.
*B60W 20/40*    (2016.01)
*B60W 10/02*    (2006.01)
(Continued)

(52) U.S. Cl.
CPC .............. *B60W 20/40* (2013.01); *B60K 6/387* (2013.01); *B60W 10/02* (2013.01); *B60W 10/08* (2013.01);
(Continued)

(58) Field of Classification Search
None
See application file for complete search history.

(56) References Cited

U.S. PATENT DOCUMENTS

| 6,494,810 B1 * | 12/2002 | Mack .................... B60W 10/02 477/174 |
| 2013/0158825 A1 * | 6/2013 | Bader ..................... F16D 48/06 701/68 |

(Continued)

FOREIGN PATENT DOCUMENTS

| DE | 10349445 A1 | 5/2004 |
| DE | 102012224278 A1 | 3/2014 |

(Continued)

OTHER PUBLICATIONS

Extended European Search Report dated Mar. 23, 2017, issued in European Patent Application No. 16181444.7.

*Primary Examiner* — Justin Holmes
(74) *Attorney, Agent, or Firm* — McDermott Will & Emery LLP

(57) ABSTRACT

A method for learning a touch point of an engine clutch of a hybrid electric vehicle including a motor connected to a transmission and an engine selectively connected to the motor through the engine clutch includes determining whether a learning condition of the touch point of the engine clutch is satisfied, releasing a transmission clutch and controlling a motor speed when the learning condition is satisfied, increasing a coupling pressure of the engine clutch when a change amount of the motor speed is less than a first predetermined value, comparing a change amount of a motor torque according to the increased coupling pressure of the engine clutch with a second predetermined value, and learning the touch point of the engine clutch when the change amount of the motor torque is greater than or equal to the second predetermined value.

11 Claims, 4 Drawing Sheets

(51) Int. Cl.
*B60W 10/08* (2006.01)
*B60W 20/00* (2016.01)
*B60W 30/18* (2012.01)
*B60K 6/387* (2007.10)
*F16D 48/08* (2006.01)
*B60K 6/48* (2007.10)
*B60W 50/00* (2006.01)

(52) U.S. Cl.
CPC ...... *B60W 20/00* (2013.01); *B60W 30/18072* (2013.01); *F16D 48/08* (2013.01); *B60K 2006/4825* (2013.01); *B60W 2030/1809* (2013.01); *B60W 2050/0075* (2013.01); *B60W 2050/0087* (2013.01); *B60W 2050/0088* (2013.01); *B60W 2510/0225* (2013.01); *B60W 2510/081* (2013.01); *B60W 2510/082* (2013.01); *B60W 2510/083* (2013.01); *B60W 2510/084* (2013.01); *B60W 2510/1005* (2013.01); *B60W 2510/244* (2013.01); *B60W 2540/10* (2013.01); *B60W 2540/12* (2013.01); *B60W 2540/16* (2013.01); *B60W 2710/022* (2013.01); *B60W 2710/027* (2013.01); *B60W 2710/081* (2013.01); *B60W 2710/1011* (2013.01); *B60Y 2200/92* (2013.01); *B60Y 2300/182* (2013.01); *B60Y 2300/42* (2013.01); *B60Y 2300/60* (2013.01); *B60Y 2300/91* (2013.01); *B60Y 2400/42* (2013.01); *B60Y 2400/4242* (2013.01); *F16D 2500/50251* (2013.01); *F16D 2500/50281* (2013.01); *Y02T 10/6252* (2013.01); *Y02T 10/76* (2013.01); *Y10S 903/914* (2013.01); *Y10S 903/93* (2013.01)

(56) References Cited

U.S. PATENT DOCUMENTS

| | | | |
|---|---|---|---|
| 2013/0325231 | A1 | 12/2013 | Park |
| 2014/0136064 | A1* | 5/2014 | Baek .................. F16D 48/06 701/68 |
| 2016/0076605 | A1* | 3/2016 | Kim .................... F16D 48/06 701/68 |

FOREIGN PATENT DOCUMENTS

| | | |
|---|---|---|
| JP | 2012-086722 A | 5/2012 |
| KR | 10-0906905 B1 | 7/2009 |
| KR | 10-2013-0136779 A | 12/2013 |
| KR | 10-1371461 B1 | 3/2014 |
| KR | 10-1371482 B1 | 3/2014 |
| KR | 10-1470209 B1 | 12/2014 |

* cited by examiner ian Patent Application No. 10-2015-0152445, filed with the Korean Intellectual Property Office on Oct. 30, 2015, the entire contents of which are incorporated herein by reference.

APPARATUS AND METHOD FOR LEARNING TOUCH POINT OF ENGINE CLUTCH OF HYBRID ELECTRIC VEHICLE

CROSS-REFERENCE TO RELATED APPLICATION

This application claims the benefit of priority to Korean Patent Application No. 10-2015-0152445, filed with the Korean Intellectual Property Office on Oct. 30, 2015, the entire contents of which are incorporated herein by reference.

TECHNICAL FIELD

The present disclosure relates to an apparatus and a method for learning a touch point of an engine clutch of a hybrid electric vehicle. More particularly, the present disclosure relates to an apparatus and a method for learning a touch point of an engine clutch of a hybrid electric vehicle that learns the touch point of the engine clutch when the hybrid electric vehicle is running in an electric vehicle mode.

BACKGROUND

Generally, a hybrid electric vehicle is driven by an engine which generates torque from fuel combustion and an electric motor which generates torque from an electric battery or other source of electricity.

The hybrid electric vehicle may be classified into two types depending on a power source, or power path, of the engine and the motor. A parallel type of hybrid electric vehicle is driven by mechanical power of the engine directly and uses electric power of the motor in case such a need arises. On the other hand, a straight type (or a series type) of hybrid electric vehicle is driven by electric power of the motor which is converted from mechanical power of the engine by a generator.

In the parallel hybrid vehicle, in order to transfer power of the engine to a driving shaft, an engine clutch may be mounted between the engine and the motor. The hybrid vehicle may provide an electric vehicle (EV) mode that provides running of the vehicle with a torque of only the motor and a hybrid electric vehicle (HEV) mode that provides running of the vehicle with the combination of an engine torque and a motor torque according to whether the engine clutch is coupled.

The hybrid electric vehicle may advantageously estimate and learn a touch point of the engine clutch for stable power delivery and rapid torque response.

A transmission mounted electric device (TMED) type of the hybrid electric vehicle, which may be provided with an automatic transmission, uses a wet engine clutch and learns the touch point of the engine clutch when a shift stage, position, is a P stage or an N stage.

However, the hybrid electric vehicle which is provided with a dual clutch transmission (DCT) may use a dry engine clutch, so learning of the touch point of the engine clutch is necessary compared to the wet engine clutch. Moreover, a conventional method for learning the touch point of the engine clutch applied to wet engine clutch may be less accurate than desired accuracy.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for learning a touch point of an engine clutch of a hybrid electric vehicle having advantages of learning the touch point of the engine clutch during the hybrid electric vehicle running in an EV mode.

An exemplary embodiment of the present disclosure provides a method for learning a touch point of an engine clutch of a hybrid electric vehicle including a motor connected to a transmission and an engine selectively connected to the motor through the engine clutch that may include determining whether a learning condition of the touch point of the engine clutch is satisfied; releasing a transmission clutch and controlling a motor speed when the learning condition is satisfied; increasing a coupling pressure of the engine clutch when a change amount of the motor speed is less than a first predetermined value; comparing a change amount of a motor torque according to the increased coupling pressure of the engine clutch with a second predetermined value; and learning the touch point of the engine clutch when the change amount of the motor torque is greater than or equal to the second predetermined value.

The method may further include finishing the control of the motor speed, releasing the engine clutch, and coupling the transmission clutch after learning the touch point of the engine clutch.

The learning condition may be satisfied when the hybrid electric vehicle is in an EV mode, a position value of an accelerator pedal and a position value of a brake pedal are 0, a battery State Of Charge (SOC) is greater than a threshold value, a current shift stage is a D stage, and the motor speed is within a predetermined range.

The motor speed may be controlled as a target input speed of the transmission.

The coupling pressure of the engine clutch may be increased through a signal rating which has an increasing form.

Another exemplary embodiment of the present disclosure provides an apparatus for learning a touch point of an engine clutch of a hybrid electric vehicle including a motor connected to a transmission and an engine selectively connected to the motor through the engine clutch that may include a driving information detector for detecting a running state of the hybrid electric vehicle; and a controller for coupling or releasing the engine clutch based on a signal from the driving information detector, wherein the controller may learn the touch point of the engine clutch by increasing a coupling pressure of the engine clutch after releasing a transmission clutch and controlling the a motor speed when a learning condition of the touch point of the engine clutch is satisfied.

The controller may finish the control of the motor speed, release the engine clutch, and couple the transmission clutch after learning the touch point of the engine clutch.

The controller may increase the coupling pressure of the engine clutch when a change amount of the motor speed is less than a first predetermined value.

The controller may control the motor speed as a target input speed of the transmission.

The controller may compare a change amount of a motor torque according to the increased coupling pressure of the engine clutch with a second predetermined value and learn the touch point of the engine clutch when the change amount of the motor torque is greater than or equal to the second predetermined value.

The controller may determine that the learning condition is satisfied when the hybrid electric vehicle is in an EV mode, a position value of an accelerator pedal and a position value of a brake pedal are 0, a battery SOC is greater than a threshold value, a current shift stage is a D stage, and the motor speed is within a predetermined range.

The controller may increase the coupling pressure of the engine clutch through a signal rating which has an increasing form.

The engine clutch may include a dry type engine clutch.

As described above, according to an exemplary embodiment of the present disclosure, a touch point of the engine clutch can be learned during the hybrid electric vehicle running, and accuracy of the touch point of the engine clutch can be improved.

Therefore, coupling impact of the engine clutch may be decreased, thereby improving drivability of the hybrid electric vehicle.

DETAILED DESCRIPTION

Figure 1:
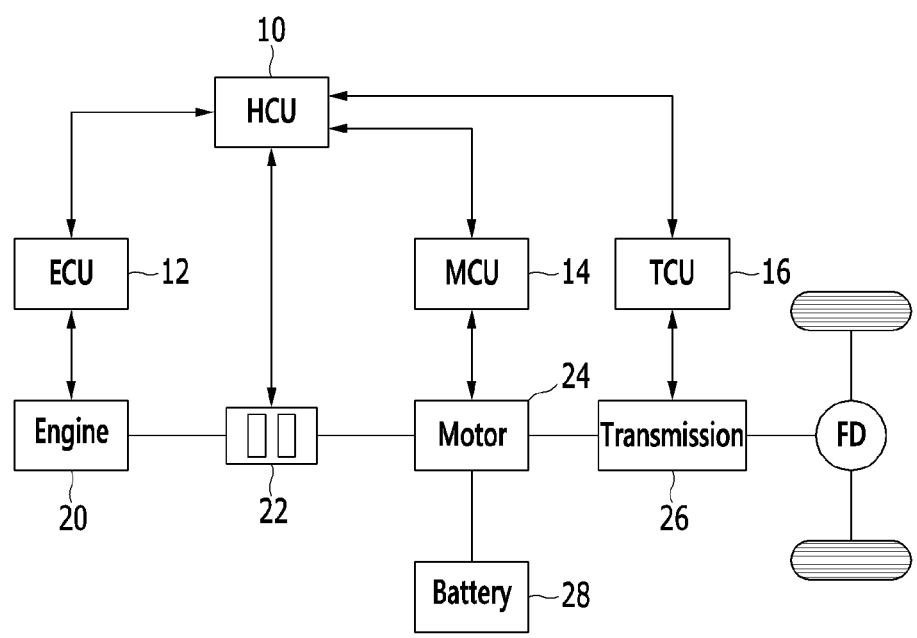
FIG. 1 is a schematic diagram of a hybrid system to which a method for learning a touch point of an engine clutch of a hybrid electric vehicle is applied according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals may designate like elements throughout the specification.

It is understood that the terms "vehicle" or "vehicular" or other similar terms as used herein are inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example, vehicles powered by both gasoline and electricity.

Additionally, it is understood that some of the methods may be executed by at least one controller. The term controller may refer to a hardware device that includes a memory and a processor configured to execute one or more steps that should be interpreted as an algorithmic structure. The memory may be configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a controller area network (CAN).

Exemplary embodiments of the present disclosure will hereinafter be described in detail with reference to the accompanying drawings.

FIG. 1 is a schematic diagram of a hybrid system to which a method for learning a touch point of an engine clutch of a hybrid electric vehicle is applied according to an exemplary embodiment of the present disclosure.

The hybrid system as shown in FIG. 1 is an exemplary embodiment of the present disclosure for better comprehension and ease of description. Therefore, a method for learning a touch point of an engine clutch of a hybrid electric vehicle according to an exemplary embodiment of the present disclosure may not only be applied to the hybrid system as shown in FIG. 1, but may also be applied to all other hybrid systems.

As shown in FIG. 1, the hybrid system to which a method for learning a touch point of an engine clutch of a hybrid electric vehicle is applied according to an exemplary embodiment of the present disclosure may include a hybrid control unit (HCU) 10, an electronic control unit (ECU) 12, a motor control unit (MCU) 14, a transmission control unit (TCU) 16, an engine 20, an engine clutch 22, a motor 24, a transmission 26 and a battery 28.

The HCU 10 may control an operation of other controllers which may mutually exchange information in an entire operation of a hybrid electric vehicle, so that the HCU 10 controls output torque of the engine 20 and the motor 24 by cooperating with the other controllers.

The ECU 12 may control an entire operation of the engine 20 according to conditions of the engine 20, such as a demand torque of a driver, a coolant temperature and an engine torque.

The MCU 14 may control an entire operation of the motor 24 according to a demand torque of a driver, a driving mode of the hybrid electric vehicle and a State Of Charge (SOC) condition of the battery 28.

The TCU 16 may control an entire operation of the transmission 26 such as speed ratios of the transmission 26 depending on output torque of the engine 20 and the motor 24 and an amount of regenerative braking.

The engine 20 outputs power as a power source while turned on and operating.

The engine clutch 22 may be disposed between the engine 20 and the motor 24 to receive a control signal of the HCU 10, and selectively connect the engine 20 and the motor 24 according to a driving mode of the hybrid electric vehicle.

The motor 24 may be operated by a 3-phase AC voltage applied from the battery 28 through an inverter to generate torque, and operate as a power generator and supply regenerative energy to the battery 28 in a coast-down mode.

The transmission 26 may supply output torque of the engine 20 and an output torque of the motor 24 determined by coupling and releasing of the engine clutch 22 as an input torque and select any shift gear according to a vehicle speed and a driving condition to output driving force to a driving wheel and maintain driving.

The transmission 26 may be an automatic transmission (AT) including a plurality of planetary gear set and a plurality of friction element, or a dual clutch transmission (DCT) including a plurality of synchronizers and an actuator, but the transmission type is not limited thereto.

The battery 28 may be composed of a plurality of unit cells, and store a high voltage for supplying a voltage to the motor 24, for example, 400 V or 450 V DC.

The hybrid system as described above may be obvious to a person of ordinary skill in the art, so a detailed explanation thereof will be omitted.

Figure 2:
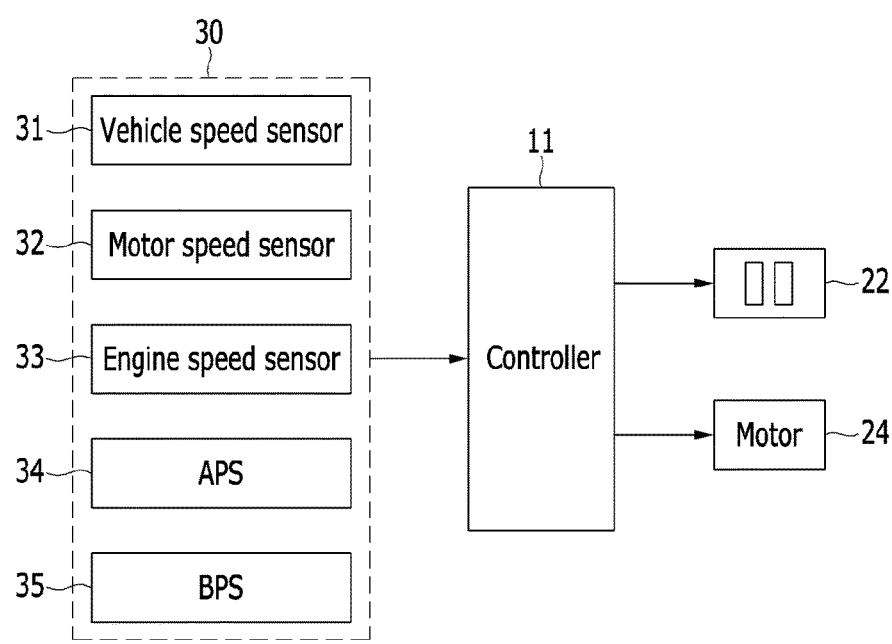
FIG. 2 is a block diagram of an apparatus for learning a touch point of an engine clutch of a hybrid electric vehicle according to an exemplary embodiment of the present disclosure.

FIG. 2 is a block diagram of an apparatus for learning a touch point of an engine clutch of a hybrid electric vehicle according to an exemplary embodiment of the present disclosure.

As shown in FIG. 2, an apparatus for learning a touch point of an engine clutch of a hybrid electric vehicle according to an exemplary embodiment of the present disclosure may include an engine clutch 22, a driving information detector 30 and a controller 11.

Processes in the method for learning the touch point of the engine clutch of the hybrid electric vehicle according to an exemplary embodiment of the present disclosure to be described below may be performed by integrating or subdividing among each controller. Therefore, for convenience of description, in this specification and claims, many controllers provided in the hybrid electric vehicle may be collectively called the controller 11.

The hybrid electric vehicle to which an exemplary embodiment of the present disclosure is applied may include at least one engine 20 and at least one motor 24. In addition, the hybrid electric vehicle may provide a driving mode in which the engine 20 and the motor 24 operate separately or simultaneously as a power source. For this purpose, the engine clutch may be disposed between the engine 20 and the motor 24 to selectively connect the engine 20 and the motor 24.

Particularly, in an exemplary embodiment of the present disclosure, the engine clutch 22 may be a dry engine clutch.

The driving information detector 30 may detect a running state of the hybrid electric vehicle and include a vehicle speed sensor 31, a motor speed sensor 32, an engine speed sensor 33, an accelerator pedal position sensor (APS) 34 and a brake pedal position sensor (BPS) 35.

The vehicle speed sensor 31 may detect a speed of the vehicle, and transmit a corresponding signal to the controller 11.

The motor speed sensor 32 may detect a rotation speed of the motor 24, and transmit a corresponding signal to the controller 11.

The engine speed sensor 33 may detect a rotation speed of the engine 20, and transmit a corresponding signal to the controller 11.

The accelerator pedal position sensor 34 may continuously detect a position value of an accelerator pedal, and transmit a monitoring signal to the controller 11. The position value of the accelerator pedal may be 100% when the accelerator pedal is pressed fully, and the position value of the accelerator pedal may be 0% when the accelerator pedal is not pressed at all.

A throttle valve position sensor (TPS) that may be mounted on an intake pipe may be used instead of the accelerator pedal position sensor 34. Therefore, in this specification and the scope of the appended claims, the accelerator pedal position sensor 34 may include the throttle valve position sensor, and the position value of the accelerator pedal may be understood to be an opening value of the throttle valve.

The brake pedal position sensor 35 may continuously detect a position value of a brake pedal, and transmit a monitoring signal to the controller 11. The position value of the accelerator pedal may be 100% when the accelerator pedal is pressed fully, and the position value of the accelerator pedal may be 0% when the accelerator pedal is not pressed at all.

That is, the controller 11 may detect the data related to driver's acceleration command and/or brake command through the accelerator pedal position sensor 34 and the brake pedal position sensor 35.

The controller 11 may learn the touch point of the engine clutch 22 by increasing a coupling pressure of the engine clutch 22 after releasing a transmission clutch and controlling a motor speed when a learning a condition of the touch point of the engine clutch 22 is satisfied.

The controller 11 may increase the coupling pressure of the engine clutch when a change amount of the motor speed is less than a first predetermined value.

In addition, the controller 11 may compare a change amount of a motor torque according to the increased coupling pressure of the engine clutch 22 with a second predetermined value and learn the touch point of the engine clutch 22 when the change amount of the motor torque is greater than or equal to the second predetermined value.

The controller 11 may finish the control of the motor speed after learning the touch point of the engine clutch 22, release the engine clutch 22 and couple the transmission clutch.

For these purposes, the controller 11 may be implemented as at least one processor that is operated by a predetermined program, and the predetermined program may be programmed to perform each step of a method for learning the touch point of the engine clutch of the hybrid electric vehicle according to an exemplary of the present disclosure.

Hereinafter, a method for learning a touch point of an engine clutch of a hybrid electric vehicle according to an exemplary embodiment of the present disclosure will be described in detail with reference to FIG. 3 and FIG. 4.

Figure 3:
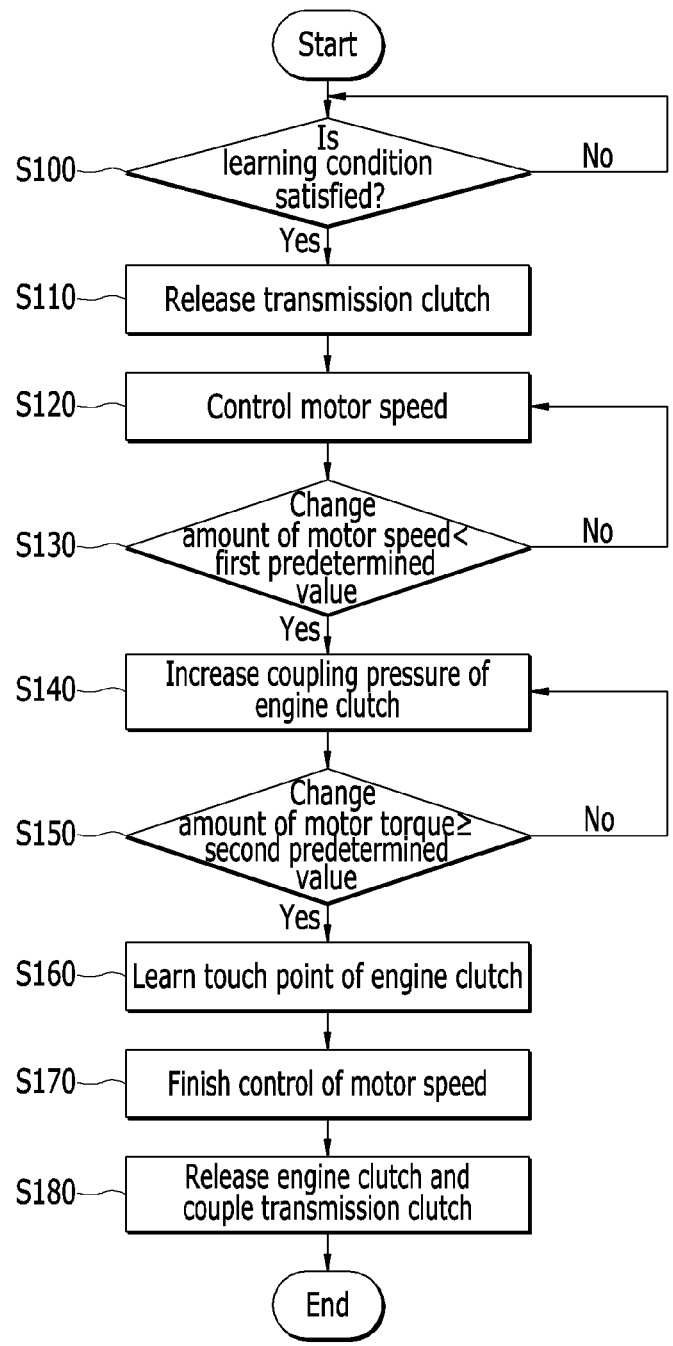
FIG. 3 is a flowchart illustrating a method for learning a touch point of an engine clutch of a hybrid electric vehicle according to an exemplary embodiment of the present disclosure.
Figure 4:
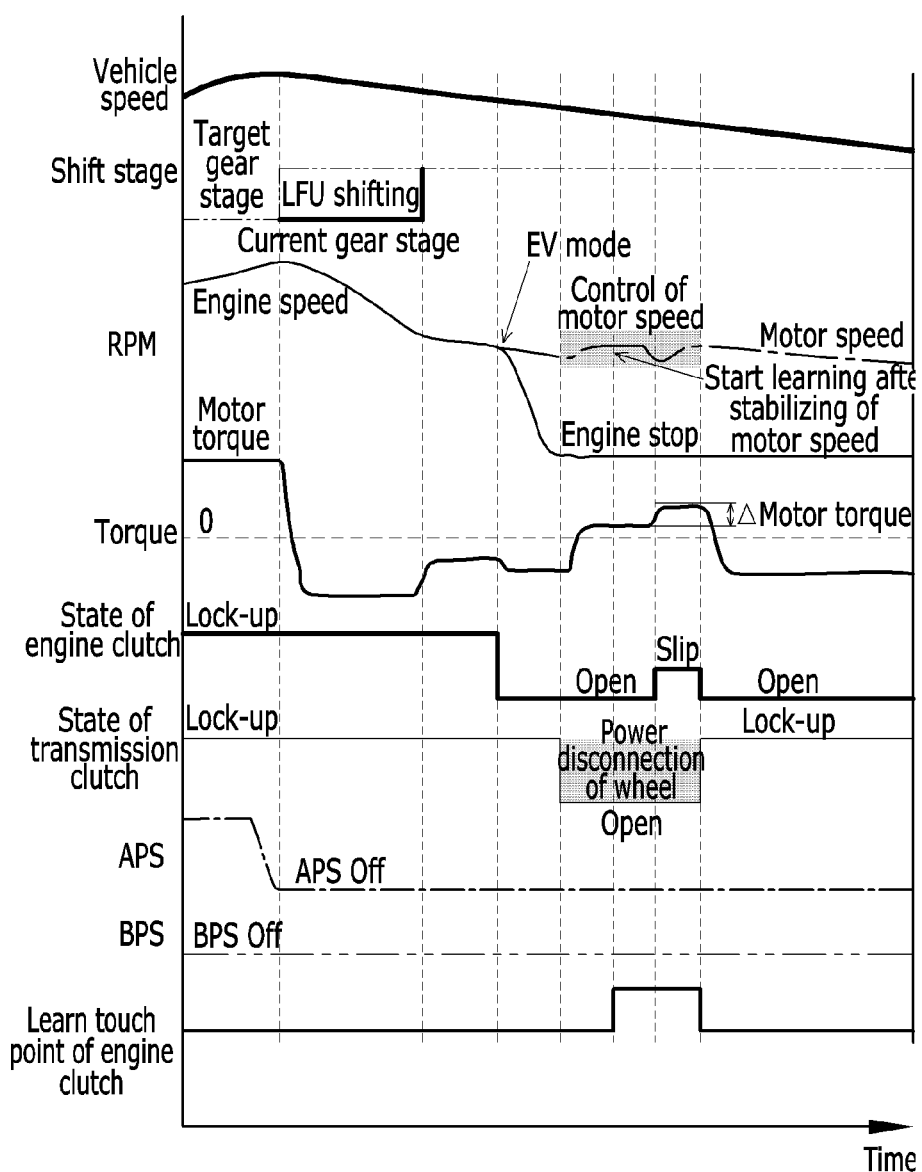
FIG. 4 is a diagram showing a state of the hybrid electric vehicle in accordance with a learning process according to an exemplary embodiment of the present disclosure.

FIG. 3 is a flowchart illustrating a method for learning a touch point of an engine clutch of a hybrid electric vehicle according to an exemplary embodiment of the present disclosure, and FIG. 4 is a diagram illustrating a state of the hybrid electric vehicle in accordance with a learning process according to an exemplary embodiment of the present disclosure.

As shown in FIG. 3, a method for learning a touch point of an engine clutch of a hybrid electric vehicle according to an exemplary embodiment of the present disclosure may start with determining whether a learning condition of the touch point of the engine clutch is satisfied based on a signal from the driving information detector 30 at step S100.

Herein, the controller 11 may determine that the learning condition is satisfied when the hybrid electric vehicle is coasting in an EV mode. As shown in FIG. 4, the learning condition may be satisfied when the hybrid electric vehicle is in the EV mode, a position value of an accelerator pedal and a position value of a brake pedal are 0, a battery SOC is greater than a threshold value, a current shift stage is a D stage and the motor speed is within a predetermined range.

That is, the controller 11 may determine that the learning condition is satisfied when the motor speed is within the predetermined range between a minimum input speed and a maximum input speed of the transmission in a current shift stage, or position, in order to minimize power consumption.

When the learning condition of the touch point of the engine clutch is satisfied at the step S100, the controller 11 may release the transmission clutch at step S110.

During the controller 11 learning the touch point of the engine clutch, a disturbance such as a coasting torque of a wheel may occur. Therefore, as shown in FIG. 4, the controller 11 may release the transmission clutch in order to improve learning accuracy in a state of releasing the engine clutch 22.

When the transmission clutch is released at the step S110, the controller 11 may control the motor speed at step S120.

The motor speed should be stabilized to increase a coupling pressure of the engine clutch 22. Thus, the controller 11 may control the motor speed at step S120.

Herein, the controller 11 may control the motor speed as a target input speed of the transmission in order to recouple the transmission clutch after learning the touch point of the engine clutch. The target input speed of the transmission 26 may be determined as a value where a transmission output speed is divided by a gear ratio of a target gear stage in an automatic transmission or an input shaft speed of the target gear stage in a dual clutch transmission.

When the motor speed is controlled at the step S120, the controller 11 may determine whether the motor speed is stabilized. That is, the controller 11 may compare a change amount of the motor speed with a first predetermined value at step S130.

When the change amount of the motor speed is less than the first predetermined value at the step S130, the controller 11 may increase the coupling pressure of the engine clutch 22 at step S140.

Herein, the coupling pressure of the engine clutch may be increased through a signal rating which has an increasing form. For example, a signal which has a ramp form monotone increasing or step increasing may be used.

When the coupling pressure of the engine clutch 22 is increased at the step S140, a motor torque may be changed according to a load of the engine. Therefore, the controller 11 may compare a change amount of the motor torque according to the increased coupling pressure of the engine clutch with a second predetermined value at step S150.

When the change amount of the motor torque is greater than or equal to the second predetermined value at the step S150, the controller 11 may learn the touch point of the engine clutch 22 at step S160.

After, the controller 11 may finish the control of the motor speed at step S170, release the engine clutch 22 and couple the transmission clutch at step S180.

As described above, according to an exemplary embodiment of the present disclosure, the touch point of the engine clutch can be learned during hybrid electric vehicle operating, and accuracy of the touch point of the engine clutch can be improved. Therefore, coupling impact of the engine clutch may be decreased, thereby improving drivability of the hybrid electric vehicle.

While this disclosure has been described in connection with what is presently considered to be practical exemplary embodiments, it is to be understood that the disclosure is not limited to the disclosed embodiments. On the contrary, this disclosure is intended to cover various modifications and equivalent arrangements included within the spirit and scope of the appended claims.

What is claimed is:

1. A method for learning a touch point of an engine clutch of a hybrid electric vehicle including a motor connected to a transmission and an engine selectively connected to the motor through the engine clutch, comprising steps of:
   determining whether a learning condition of the touch point of the engine clutch is satisfied;
   releasing a transmission clutch and controlling a motor speed when the learning condition is satisfied;
   increasing a coupling pressure of the engine clutch when a change amount of the motor speed is less than a first predetermined value;
   comparing a change amount of a motor torque according to the increased coupling pressure of the engine clutch with a second predetermined value; and
   learning the touch point of the engine clutch when the change amount of the motor torque is greater than or equal to the second predetermined value,
   wherein when the learning condition is not satisfied after the step of determining, the method repeats the step of determining, and
   wherein the motor speed is controlled as a target input speed of the transmission.

2. The method of claim 1, after the step of learning the touch point of the engine clutch, further comprising:
   finishing the control of the motor speed, releasing the engine clutch and coupling the transmission clutch.

3. The method of claim 1, wherein the learning condition is satisfied when the hybrid electric vehicle is in an electric vehicle (EV) mode, a position value of an accelerator pedal and a position value of a brake pedal are 0, a battery State Of Charge (SOC) is greater than a threshold value, a current shift stage is a drive (D) stage and the motor speed is within a predetermined range.

4. The method of claim 1, wherein the coupling pressure of the engine clutch is increased through a signal rating which has an increasing form.

5. An apparatus for learning a touch point of an engine clutch of a hybrid electric vehicle including a motor connected to a transmission and an engine selectively connected to the motor through the engine clutch, comprising:
   a driving information detector for detecting a running state of the hybrid electric vehicle; and
   a controller for coupling or releasing the engine clutch based on a signal from the driving information detector,
   wherein the controller learns the touch point of the engine clutch by increasing a coupling pressure of the engine clutch after releasing a transmission clutch and controlling the a motor speed when a learning condition of the touch point of the engine clutch is satisfied, and
   wherein the controller controls the motor speed as a target input speed of the transmission.

6. The apparatus of claim 5, wherein the controller finishes the control of the motor speed, releases the engine clutch and couples the transmission clutch after learning the touch point of the engine clutch.

7. The apparatus of claim 5, wherein the controller increases the coupling pressure of the engine clutch when a change amount of the motor speed is less than a first predetermined value.

8. The apparatus of claim 5, wherein the controller compares a change amount of a motor torque according to the increased coupling pressure of the engine clutch with a second predetermined value and learns the touch point of the engine clutch when the change amount of the motor torque is greater than or equal to the second predetermined value.

9. The apparatus of claim 5, wherein the controller determines that the learning condition is satisfied when the hybrid electric vehicle is in an electric vehicle (EV) mode, a position value of an accelerator pedal and a position value of a brake pedal are 0, a battery SOC is greater than a threshold value, a current shift stage is a drive (D) stage and the motor speed is within a predetermined range.

10. The apparatus of claim 5, wherein the controller increases the coupling pressure of the engine clutch through a signal rating which has an increasing form.

11. The apparatus of claim 5, wherein the engine clutch includes a dry type engine clutch.

* * * * *